United States Patent Office 3,462,299
Patented Aug. 19, 1969

3,462,299
CONTINUOUS TREATMENT OF LIQUIDS, SUCH
AS SUGAR JUICE, WITH AN ADSORBENT
Wilhelm Haberich and Erhard Hermann Gustav Felber,
Braunschweig, Germany, assignors to Braunschweigische Maschinenbauanstalt, Braunschweig, Germany
Filed Jan. 11, 1966, Ser. No. 519,933
Claims priority, application Germany, Jan. 15, 1965,
B 80,121
Int. Cl. C13d 3/14; B01j 1/04
U.S. Cl. 127—9    6 Claims

ABSTRACT OF THE DISCLOSURE

Apparatus for processes using regenerable materials includes a series of cells arranged for connection serially in groups of predetermined number, with means for sequentially changing the connections to each group so that as one cell in each group is connected, or disconnected, serially into, or out of, each group it is correspondingly disconnected from, or connected into, the adjacent group in the series.

This invention relates to improvements in apparatus for the treatment of sugar juices or other solution where impurities are absorbed and/or adsorbed or removed by ion exchange by means of regenerable substances.

Such treatment is generally carried out by passing the juice or solution through such regenerable substance until its capacity is substantially exhausted and no further impurities are taken up. Subsequently, the regenerable substance is washed in the same container and freed from residues of the treated solution; thereby, the impurities retained by the filtering action of the active mass are separated by rinsing in counter-current to the normal direction of passage. Then, the active substance is regenerated by treatment with a suitable solution, and the regeneration agent must then be washed out. The regeneration and subsequent washing step require generally an extended period of time where the substance to be regenerated is not available for the treatment of the juice or solution. It is for this reason that in a continuous treatment of juices or solutions, several exchange or absorber beds must be provided which are alternately employed in accordance with a predetermined time schedule determined by the different treatment periods required for the respective steps of the purification process.

In the known periodical procedure, there is required a rather complicated piping system including a great number of switching, shut-off, and control devices; also a very large amount of active substance is necessary which at times cannot be fully utilized because the individual steps of the process often require unequal times.

Generally, a considerable excess of regenerating agent is required for the regeneration of the active substance; such excess may be 100 to 150 percent of the theoretically or stoichiometrically required amount. The excess requirement is due to the fact that a single passage of the regenerating agent through a stationary bed of the active material does not allow of a complete utilization of said agent while, on the other hand, a substantially complete regeneration of the active material is desired. Even a fractionated recovery of the regenerating agent, in spite of the additional apparatus required therefor, does not substantially reduce the necessary excess of regenerating agent.

Similarly, also a substantial excess of liquid is required for the washing and rinsing of the regenerable materials. Said liquids mix very quickly with the liquid media already present in the containers, and this necessitates again using a very great excess of fresh washing and rinsing liquid to obtain complete removal of the regenerating agent and other liquids.

For the recited reasons, the juices and solutions to be treated are quite strongly diluted on their passage through the vessels containing the absorbents or exchange resins. If, for instance, a sugar solution is charged upon the vessels filled with water, an intimate mixing takes place and the starting concentration of the solution is considerably decreased. The same phenomena occur at each change of the passing medium. As a result, the quantities of waste water in the known installations are relatively large but have only a low concentration of organic and/or inorganic impurities.

The drawbacks referred to hereinabove are observed particularly in conventional ion exchange installations for the complete desalination of water, sugar solutions, and the like as well as for neutral exchange, deliming, and decolorization methods, and for the merely absorptive treatment of solutions.

In order to overcome said difficulties of the periodical procedures, various continuous processes for the treatment of sugar juices or other solutions of the character described have been proposed. In said processes, the active substance is passed mechanically through the various zones in which it is contacted with the solution to be purified, the wash liquid, the regenerating agent and finally the liquid for washing out said regenerating agent.

For instance, it is known to pass the ion exchange resins in the same direction or in countercurrent by means of pumps or other conveying means through said media, or to use the current of the solution to be treated itself to subject the resins to turbulent motion. Due to the mechanical motion, considerable losses take place by attrition, and as ion exchange resins have very low mechanical strength, such continuous methods involving mechanical movement of the resins are uneconomic.

It has also been proposed to pass the regenerable substances in open vessels through various sprinkling or spraying zones, where the media corresponding to the respective treatment steps are applied in the individual zones. Also in such procedures, the substances have to be moved mechanically; anyhow, they provide for a very low utilization and, therefore, low efficiency because there, at least in the upper part of the vessels, the substances are only superficially wetted by the medium and the time of contact of the regenerable substance with such medium is short.

It is a principal object of the invention to provide an apparatus for the treatment of sugar juices or other solutions which makes it possible to carry out continuously the various steps with a small amount of regenerable substance and better utilization of the regenerating solutions. The juice becomes less diluted, and the amount of waste water is reduced while the regenerable substance is not subjected to attrition.

It is a further object of the invention to provide such an apparatus requiring a relatively very small number of measuring, regulating, and control means.

Other objects and advantages will be apparent from a consideration of the specification and claims.

In accordance with the invention, the regenerable substance is arranged as a stationary bed in a plurality of separate containers to be flooded which are equipped with inlet and outlet lines; said containers are arranged into separate groups which are connected in series for the cyclic passage of the respective media for charging, washing, regenerating, final washing, and means are provided to separate the first containers of a group, in the direction of travel of the respective liquids, from the group and to connect the same to the end of the following group of the cycle.

The novel arrangement has the effect that the last containers of the individual groups, e.g. the last containers of the charging zone, are subject to a peak treatment with the solution to be treated because said solution had been extensively pretreated in the preceding containers of said group and because said last containers of the group of the preceding treating zone are practically still unused. In contrast thereto, the substance in the first container, which, with respect to the passage of the solution has assumed all positions inside the group, one after the other, is so far exhausted as to permit still only a partial treatment of the solution; on the other hand, said substance is utilized to the limit of its capacity and subsequently connected to the end of the following group by means of the separation and rearrangement referred to above.

In the regeneration of the active substance, the regenerating solution passes through the series-connected containers in such a way that the container which is first in the direction of flow of the sugar juice or solution is charged with the regenerating solution which is the most consumed while the container which is the last in the direction of flow of the sugar juice, receives the fresh regenerating solution and its contents are, therefore, regenerated to top activity.

In order to maintain the continuous procedure, the separation of the first container or containers of a group and their stepwise switching to a subsequent group of the cycle after predetermined periods of time, and the change-over of an equal number of last containers are made simultaneously.

The total installation consists of as many groups of series-connected containers as there are operational steps.

The number of series-connected containers is determined by the lentgh of time required for the individual steps, the rate of flow, and other technological factors bearing on the course of the procedure.

The treatment with the apparatus of the invention comprises an endless chain of the individual steps such as charging, rinsing, regenerating, washing, where always after termination of the last step immediately the first step follows again and where the total active substance is always in service. Due to the arrangement of the treatment zones and due to the stepwise disconnection and connection of the same from one group to another group, the active substance is utilized to its maximum capacity; therefore, the required amount of active substance can be kept much lower than in the conventional purification methods.

By means of the stepwise switching operation, the series-connected zones of each group advance by one or several positions to have each zone at all times located in just that position within the respective group which is most appropriate with respect to the condition of the active substance contained in said zone. For example, in the regenerating or reactivating operation, the zone which had first been contacted with the most exhausted regenerating solution is then advanced in the regeneration group to a position where it is contacted with a regenerating solution which, compared with the preceding position, has a greater efficiency.

In the same way, the apparatus allows of a better utilization of the wash liquids.

At the transfer of the individual zones of one group to the next following group, the zones containing the active substance are generally passed by a liquid which is completely different from the liquid of the preceding phase.

For example, the regeneration with an acid will be followed by a washing operation with water. The last zone of the regeneration group had been just charged with fresh acid and will still be filled with water when it is advanced to the next group for carrying out the wash operation. If now water, or acid which due to the series connection in the wash process would be very diluted, would be charged into said zone, a considerable undesired dilution of the acid would take place, and such dilute acid could not be re-used for the regeneration. On the other hand, draining the wash water with the acid content of the last cell would result in a considerable loss of acid, which is also uneconomical. The same considerations apply to all other operations regarding the addition of one or more new zones, as e.g., on charging, washing, regenerating, and others. In order to avoid the recited drawbacks, one or more separate zones may be provided between the groups which are temporarily added to the exit side of the preceding group for discharge.

With such an arrangement, the respective liquid is recovered from said separate containers provided between the groups and fed into the preceding phase or group. In this way, substantial dilution of the solutions to be treated is prevented. Of, for instance, sugar juice is subjected to a deashing treatment, the required dilution of said sugar solution will be to about 40–50%. After treatment, the concentration of said solution will be only slightly below the starting concentration, and the subsequent concentration does not require any large amounts of steam.

The discharge from the intermediate containers provided between the groups has a particular bearing on the waste water. As the waste water consists substantially of the used up regenerating solutions, and as said solutions can be employed at substantially higher concentration than in the periodic batch process, and as no substantial dilution takes place during the procedure, the waste water is obtained in high concentration, which means in a very small amount. A further concentration and even evaporation of said waste water is, therefore, possible without great expenditure. The salts obtained on evaporation may even constitute a further useful end product. By partial use of the wash liquid, after passage through the respective spaces which are in the wash phase, for the dilution of the preceding treating medium, which for reasons of storability is generally in concentrated form, further water savings may be accomplished.

It is of advantage to provide the separate containers as closed cells with liquid-permeable walls at the inlet and outlet sides.

For carrying out the various steps, particularly for switching the cells, we may provide in the inlet and outlet lines of the cells valves which make it possible to connect the inlets and outlets, in accordance with the varying group associations, to the respective neighboring cells or to the feed containers for the various liquids. In view of the required stepwise changes of the individual cells, such arrangement requires considerable construction cost for the required valves and conduits.

According to the invention, the apparatus can be made much simpler by providing each cell with an inlet and outlet line equipped with a pump, and by connecting the admission lines to the cells with stationary separate intermediary containers to which the treatment liquids are supplied by means of separate priming containers which are subdivided according to the cell groups and movable; the outlets of the cells discharge always into, or above, the movable priming container of the cell which in the moving rhythm is the preceding one. There are further provided feed discharge lines for the treatment liquid of the cell groups, which lines are movable with said priming containers. The feed line of each cell group opens into the last intermediary container, and the discharge line in the first priming container, viewed in the direction of advance.

This arrangement provides, without specific valves and closed-circuit pipe lines, and without alternately switched feed lines, for a stepwise advance of the individual cells within the groups and to the next group; an intermediate position can be arranged for discharge whereby only the priming containers have to be advanced in the advancing rhythm of the respective cell change in predetermined time intervals. The cells including the intermediary containers and the pumps can be stationary so as to restrict the movements required for performing the consecutive treatment steps to a few parts of the apparatus.

We prefer to connect the intermediary container, which, in the direction of movement, is coordinated to the first movable priming container of each group with the discharge line of the medium, only at the discharge side for the discharge also of the cell with the last priming container of the preceding group. In this way, the cell cooperating with the recited intermediary container is discharged over said container and does not participate in the cycle of the various treatment steps like charging, washing, regenerating, rinsing. This arrangement allows of discharging the individual cells always after each of the treatment steps before they are added to the next following group.

In a preferred embodiment of the invention of particularly simple construction, the intermediary and the movable containers are formed by preferably superposed partitioned circular closed channels, whereby the channel forming the priming containers is stepwise rotatable around a common center axis; each feed line for the medium for the last intermediary container of the separate cell groups is connected to a rotatable circular channel, while the discharge lines of the media from the first priming containers of each group open in, or above, stationary collecting channels which are preferably arranged below the rotatable feed channels. Thereby, each medium has separate feed and discharge channels which, via the recited lines, are connected to the last intermediary container of the respective group and to the first priming container of the group, respectively. The number of the collecting and feed channels depends on the number of different liquids used for the cells. Said channels may be juxtaposed or superposed, and they may be fed by, and discharge into, stationary or movable feed and discharge lines. Said lines are then connected to additional storage vessels or processing apparatus.

A simple discharge of the cells which are situated between the cell groups and do not take part in the various treatment steps, is obtained, according to the invention, by providing between the inlet and outlet lines of each cell a preferably electromagnetically actuated drain valve which, when open, allows drainage through the outlet line into the last priming container of the preceding group.

Various embodiments of the invention will be described in connection with the accompanying drawings but it will be understood that the invention is not limited thereto.

Figure 1:
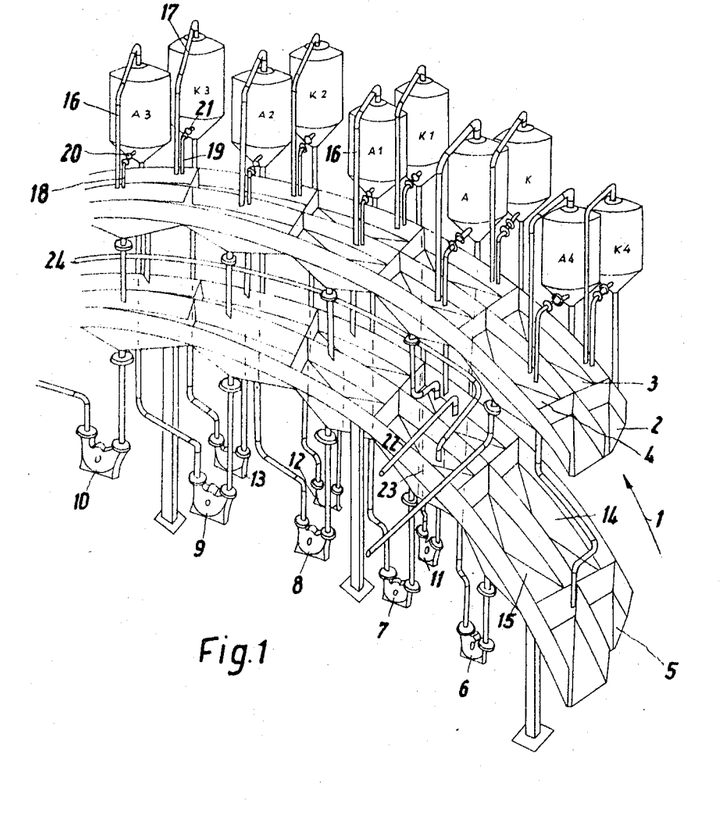
FIG. 1 is a partial diagrammatic perspective view of the circular arrangement of cells for the anion and cation exchanger of a sugar desalting plant with partitioned stationary and movable or channels for the simultaneous supply of the liquids to the system and for progressively and cyclically changing the nature of the liquid supplied to the stationary resin beds within the system.

In the apparatus of FIG. 1, the exchange cells are arranged in two concentric circular rows. The inner cells A, A1, A2, A3, A4 are anion exchange cells, the cells K, K1, K2, K3, K4 in the outer circle receive the cation exchange resin.

The cells A1, A2, A3, and K1, K2, K3, are assumed to be in the charging zone, i.e., in the zone in which they receive the sugar juice for the desalting operation.

The subsequent cells A and K are then in drainage position, while the following cells A4, K4 and others (not shown) are passed by the wash fluid. There follows then again in each row a cell in drainage position, and subsequently the cells passed by the regenerating fluid. There follow again on the periphery cells in drainage position, then cells passed by a liquid rinsing the regenerated cells and finally, again with interposition of cells in drainage position, the cells A3, K3, A2, K2 and so on, closing the ring of the cells above the channels.

Below the cells, or below their drains, there is provided a double channel 2 which is turnable around its center axis and advanced stepwise in direction of the arrow 1; the channel is divided into compartments 3, 4, each of which has a funnel-shaped outlet. Below channel 2, there is provided a similar double channel 5 which is also divided into compartments which serve as supply vessels for the treating liquids; the number of compartments in channel 5 corresponds to the number of the compartments 3, 4 whose funnel-shaped outlets open into the corresponding compartments of channel 5.

The individual compartments 14, 15 of channel 5 are connected to pumps whereby the front row of pumps 6, 7, 8, 9, 10 . . . delivers into the anion exchange cells A, A1, A2, A3 . . . and the back row 11, 12, 13 . . . into the cation exchange cells K, K1, K2 . . . The pumps are further connected to the outlets of the compartments of the channel 5 whereby the outside compartments 3 of channel 2 and the outside compartments of channel 5 cooperate with the cation exchange cells while the inside compartments 4 (front row in drawing) of channel 2 and the corresponding compartments 15 of channel 5 serve to receive the medium from the anion exchangers.

The exchange cells A, A1 . . . and K, K1 . . . are provided with overflow lines 16, 17, which open above the corresponding compartments of channel 2. At the bottom of the cells, there are outlet pipes 18, 19 provided with valves 20, 21. For the sake of clarity, these reference numerals are shown in the drawing only for a few of said lines and pipes.

The specific correlation mentioned in the following of the preliminary and intermediate containers to the cells present above the same is only meant in a spatial sense. The fact is that the said containers are in their function correlated with the cells that at any time precede in the direction of motion.

The sugar juice is introduced through line 22 which is gradually advanced at predetermined time intervals together with the channel 2. The line 22 discharges the juice above and into that compartment of channel 5 which supplies pump 11; this pump feeds the juice through line 23 (shown partly in dotted lines) upwardly into the cation exchange cell K1. The juice then overflows into the outlet 17 and passes into the corresponding compartment of channel 2, from whose outlet it flows into the compartment of channel 5 supplying the pump 12; pump 12 then conveys the juice into the cation exchange cell K2. In the same manner, the juice passes from the cell K2 over the next compartments of channels 2 and 5 and pump 13 into the cell K3 and so on until it is passed from the last cation exchange cell and the corresponding compartment of channel 2 through line 24 into the compartment of channel 5 which supplies pump 7. Said pump 7 forces the juice through a supply line into the bottom of the anion exchange cell A1, from which it passes through the outlet 16 into the compartment of channel 2 associated with said cell. From there, the juice passes through the outlet pipe of said compartment into the corresponding compartment of channel 5 and to pump 8 which forces it into the cell A2. In similar manner as described for the cation exchange cells, the juice is passed through all the cells of the anion exchange group until, at the end of the group, it is discharged into the respective compartment of channel 2 from which it flows through a drain channel into a collecting tank.

While the juice is conveyed through the exchange cells K1 . . . and A1 . . . , the valves 20, 21 of the cells A and K are opened to discharge the juice contained therein through outlet pipes 18, 19 into the corresponding compartments of channel 2. During the preceding step in the advance of channel 2, the two cells A and K were members of the charging zone, and they are, therefore, still filled with sugar juice when passed into the drainage position. For this reason, the coacting compartments of channel 2 are equipped with outlet pipes which open above that compartment of channel 5 to which untreated sugar juice is supplied through line 22. In this way, the sugar juice obtained by draining cells A and K is recycled together with the fresh sugar juice, into the anion and cation exchange cells, thus avoiding loss of said juice.

While the above recited treatment takes place, the other treatment liquids are forced through the cells and coordinated compartments of the channels 2 and 5 of the other treatment groups by their respective pumps in similar manner, while those cells between the groups which are in their drainage position, are similarly discharged, whereby the discharged liquid is always supplied to the cell group of the preceding phase.

Figure 2:
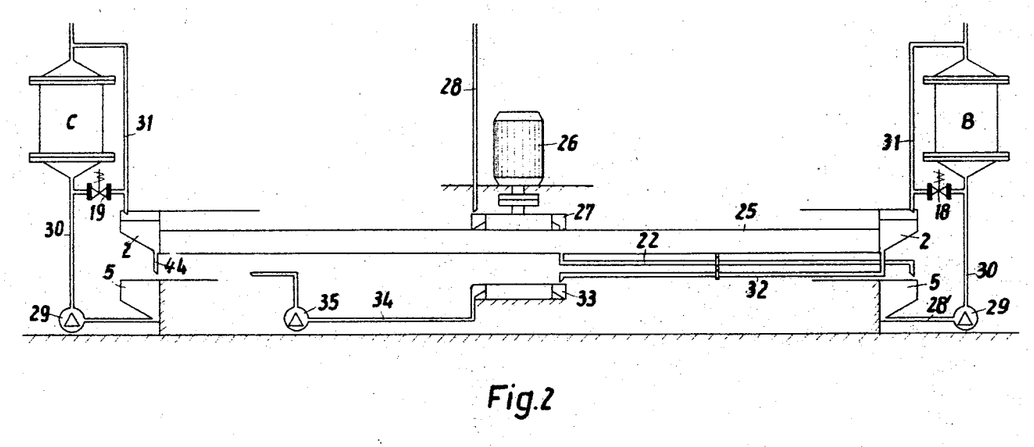
FIG. 2 shows diagrammatically in vertical section the circular arrangement of exchanger and their supply and discharge lines as well as the channels forming the compartments for liquid; one row of cells is arranged along the periphery, only two of said cells being shown, with stationary anion and cation exchange resin beds, respectively, to indicate the path of the treatment medium.

FIG. 2 illustrates an apparatus where all the cells are arranged over the circular channels in a single row. For the sake of simplicity, only two cells B and C are shown, which are meant to represent groups of cells passed by the treating liquid in the manner set forth with respect to FIG. 1.

In FIG. 2, a motor 26 advances stepwise by means of arms or a supporting disc 25 the channel 2 which is partitioned into compartments, receiving the discharge of the cells. On the carrier disc 25, there is provided a channel 27 for the medium to be supplied to the cell group B; said channel takes part in the movement of the disc 25 and channel 2. Channel 27 is fed from a supply tank through a stationary line 28, if necessary, by means of a pump. A line 22, partly shown also in FIG. 1, extends from the channel 27 and moves with disc 25. Line 22 opens above the stationary channel 5 and feeds the medium for the cells B into the compartment cooperating with the last cell of the respective group. A line 28' extends from said compartment of channel 5 to a pump 29 which through line 30 is connected to the first cell of group B.

Cells B and C are cylindrical bodies equipped with a conical bottom. Said bottom is provided with means supporting the exchange resin and separating the liquid from the resin. A similar means is provided at the top of the cells to prevent the resin from being carried away. In the embodiment of FIG. 2, the general direction of travel of the liquid is upwardly so as to have the liquid at all times flowing around the resin. It is, of course, possible, to reverse the direction of flow; in such case, we prefer to replace the free outlet 31 by a U-shaped outlet at the lower part of the cells, with a radius of curvature above the cells, so as to ensure a flooding of the cells also on downward passage of the liquid.

Magnet valves 18 and 19 are provided between the inlet lines 30 and the outlet lines 31 which are opened when the cells B or C arrive in their drainage positions.

The liquid supplied to the cell or cell group B flows from the outlet line 31 of the last cell in the respective compartment of channel 2 and from there through a return line 32, which is fixedly connected to said channel or to said compartment, into a stationary collecting channel 33, from where the medium is passed through a discharge conduit 34 and a pump 35 to a collecting tank. The introduction of liquid to the cell or cell group C is carried out in the same way as that to cell group B by means of an additional supply channel 27 (not shown). At the left-hand side of FIG. 2, in connection with cell C, it will be noted that the liquid which has passed through the cell, flows from the channel 2 through the outlet 44 into the respective compartment of channel 5. Also in this cell group, the medium is returned from the last compartment of channel 2 through a return line corresponding to line 32 of group B into a collecting channel corresponding to channel 33 and goes from there into the collecting tank for said medium.

In the embodiment of FIG. 2, the cells B and C are arranged above the channels 2 and 5, and they receive the treating fluid by means of pumps 29 from below. In contrast thereto, in the embodiment of FIG. 3, which otherwise corresponds to that of FIG. 2, the cells B and C are located below the channels 2 and 5. In this arrangement, the liquids are fed from the compartments of channel 5 to the cells B and C, and pass through said cells, by gravity, whereby the free overflows 31 of the cells open below the cells into an intermediate collecting chamber 54 which is connected by line 55 to pump 29; pump 29 forces then the medium outflowing from the cells through line 36 into the corresponding compartment of channel 2.

Figure 3:
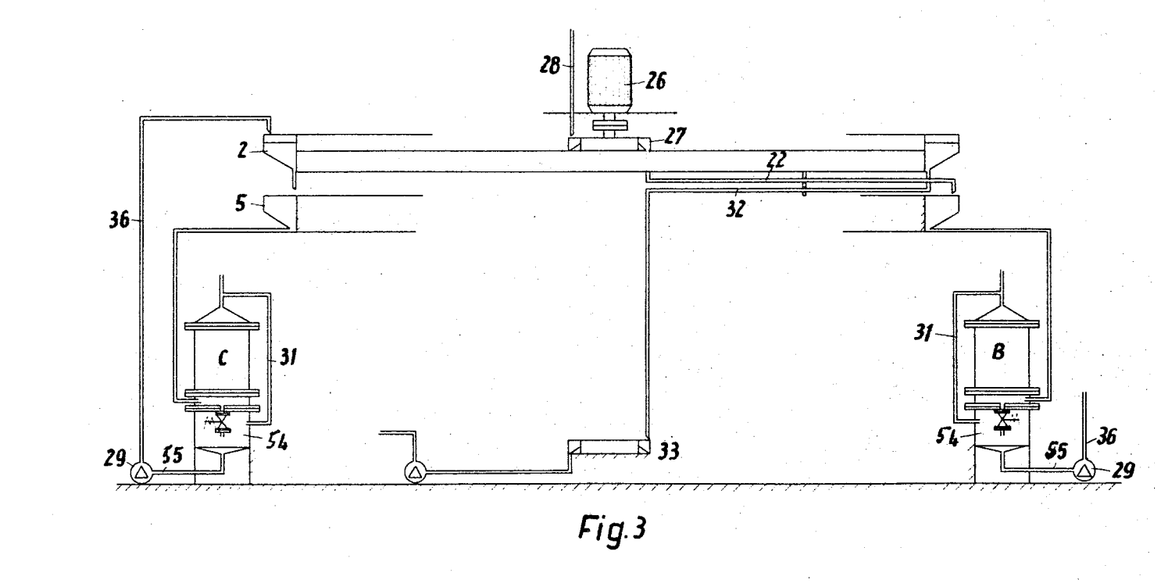
FIG. 3 is similar to FIG. 2 but showing the exchange cells below the supply and discharge lines.

In order to prevent complete drainage of the intermediate collecting chambers 54, it is of advantage to equip the same with a level control for the pump 29; such control is preferably also provided for the pumps connected to the funnel-shaped outlets of the compartments of channel 5 in the embodiment of FIG. 1.

Figure 4:
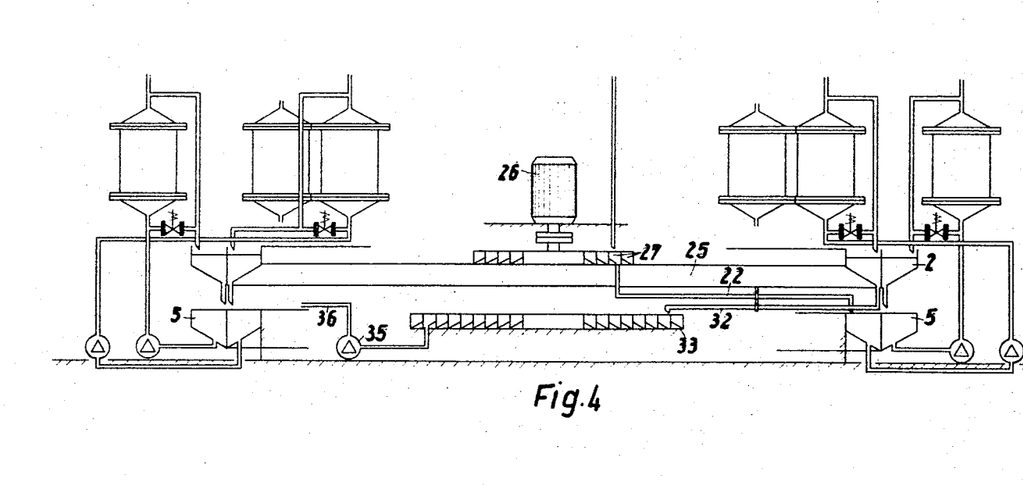
FIG. 4 is a section through the apparatus of FIG. 1.

In the embodiment of the invention diagrammatically shown in FIG. 4, the cells or cell groups cooperate with double channels 2, 5 and the anion and cation exchange cells are arranged in concentric rows as shown in the perspective view of FIG. 1.

The flow of the liquid for the group of exchange cells which are contacted with the sugar juice, has been set forth hereinabove in connection with FIG. 1 and need not be explained again. FIG. 4 shows the motor 26 for the drive, i.e. for the stepwise displacement of the channel 2, whereby the drive disc 25 carries also again the feed and distributing channels 27 for the various liquids.

Feed lines connect the channel 27 with the compartment of channel 5 for supply to the various cell groups, and lines connect compartments of channel 2 with channel 33 carrying liquid after passage through the cell group to a collecting station. FIG. 4 shows only one such feed line 32 and one return line 32.

Figure 5:
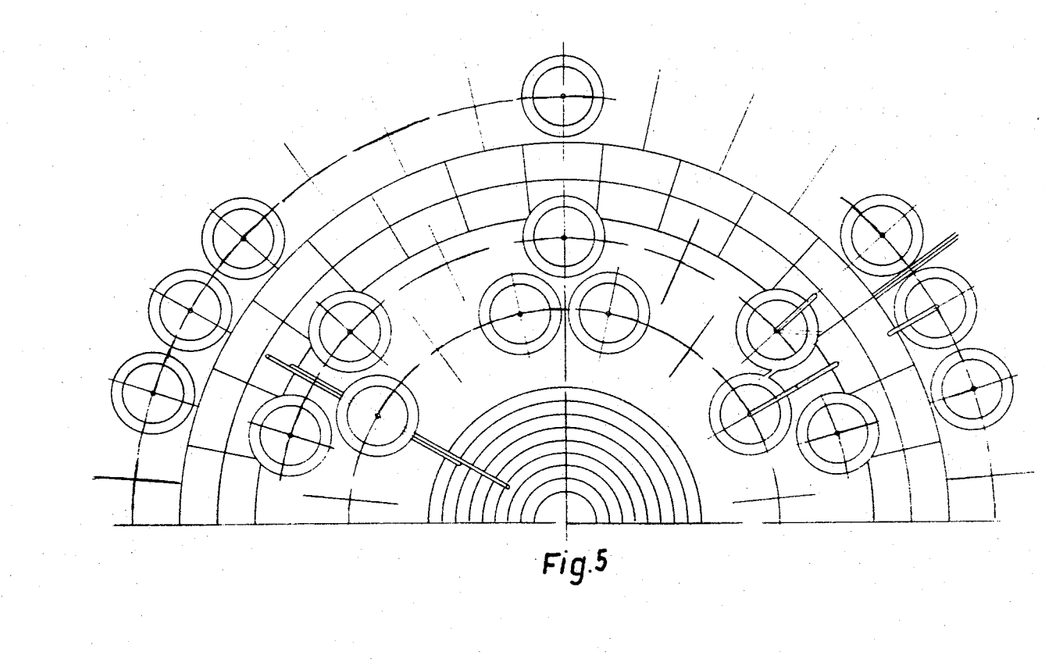
FIG. 5 is a plan view of the apparatus shown in FIG. 4, omitting, for the sake of clarity, some of the connecting piping.

A preferred spatial arrangement of the exchange cells is shown in FIG. 5, where the cells located at the outer ring periphery are arranged in a single circular row whereas the cells located at the inner periphery are radially offset to form two concentric rows.

In the arrangement of the anion and cation exchange cells of FIGS. 1, 4, and 5, the collecting channels 33 may also serve as transfer conduits for the liquid to be treated and to convey the fluid leaving the cation exchange cells into the anion exchange cell group. For this purpose, the pump 35 will feed through line 36' (FIG. 4) into the inner part of channel 5, i.e., into the first compartment cooperating with the group of anion exchange cells; in this way, the fluid or sugar juice is sequentially charged into the anion exchange cells in the manner described in connection with FIG. 1 and will then pass from the last compartment of channel 5 belonging to this group, to a collection tank.

Though the cells are stationary, they pass through all positions in their respective groups, whereby they proceed always from the last to the first position in said group and then are shifted into drainage position before they are connected to the next group.

In the desalting of sugar juice, the cation and anion exchange cells which have been utilized to exhaustion and have advanced to the first position in their group, are shifted at the next advancing step into drainage position, where the liquid contained therein is returned, through their drain pipes, to the preceding process stage, i.e. to the treatment of the juice with exchange resin. Concurrently with the transfer of the recited anion and cation exchanger into the drainage position, two fresh exchange cells are added to the end of the group comprising the cells for the exchange resin treatment of the juice so as to be passed by the juice, after it has traversed the preceding partially exhausted cells of said group.

At the next advancing step, the exchange cells which were in drainage position, advance into the group of cells to be rinsed or washed. In this group, water is passed through the cells to wash out the adsorbed residues of the sugar solution. At the following steps, said cells proceed stepwise to the first position of the group and, at the next step, again into drainage position. The run-off of said wash step, which is also called the desweetening step, is recovered as sweetwater as diluent for the sugar juice. In this way, considerable water savings are attained, and the loss of sugar solution or juice is kept at a very low level.

The washing or desweetening operation is followed by the regeneration or reactivation of the exchange cells, the cation exchange cells being treated with acid and the anion exchange cells with alkali. The respective cells are connected in series, and the cell added last to the group is charged with already strongly utilized acid or alkali. The liquid drained from said cells goes as waste water to the sewer or may be disposed of otherwise.

Following the regeneration, the cells are then again drained.

The drained solution constitutes still a perfect regenerating agent and is, as set forth hereinabove, returned and introduced, together with fresh regenerating solution, to the first cell of the reactivating group. Subsequently, the progressive advance of the cells results in washing out said exchange cells whereby said cells advance stepwise from the last to the first position in the group. The water drained from this group of the exchange cells is recovered as diluent for the acid or alkali. Subsequently, the cells are placed into drainage position, and the drained water, which is free of chemicals, is re-used as deionized water. At the following advancing step, the two exchange cells here referred to are again in the last position of that group where the juice is desalted by contact with the resin.

The preceding description shows that, unless the process is started with very dilute juices or solutions, said juices and solutions have still a high concentration when leaving the exchange apparatus. In addition, the other liquids drained from the cells can be largely reused or recycled.

Besides the desalted juice, only a small amount of high concentrated waste water is present, which can be evaporated and dried at low operating cost. This eliminates a problem of the conventional plants where a large amount of waste water is obtained which, however, contains only a low dry contents concentration. Heretofore, such waste water had to be collected in artificial storage ponds and then biologically degraded in order to release it into the sewers, which required high initial investments. The apparatus of the invention offers the possibility of evaporating and drying the waste water economically by means of cheap waste heat and using the thus obtained salts in the fertilizer industry or for other purposes.

In the apparatus of the invention, the water requirements are considerably lower than in the known installations, due to the recycling of the wash liquids and to the reuse of the deionized water. The desalted juice has a higher concentration than heretofore. Therefore, its further concentration requires less steam or energy.

It will be evident that the plant investment required for the apparatus of this invention is considerably less than that necessary for a conventionally operated plant of the same capacity.

We claim:

1. Apparatus for the continuous treatment of sugar juice and other solutions with regenerable substances for removal of impurities comprising a plurality of separate cells containing stationary beds of a regenerable substance and arranged in spaced relationship, inlet and outlet lines for each cell, pump means connected in at least one of said lines, means for connecting said cells serially in groups stationary separate intermediate containers connected with said inlet lines, movable separate intermediate containers passing the treatment fluids into said stationary containers, supply and discharge conduits for groups of said cells, and means advancing said movable containers and said supply and discharge conduits stepwise so as to travel from one to the next cell, the outlet lines of one cell always opening into the movable intermediate container associated with the next preceding cell, said supply conduits opening into that stationary intermediate container which in direction of the advancing motion is the last one of its group, and said discharge conduits opening into that movable intermediate container which in direction of the advancing motion is the first one of its group.

2. Apparatus as claimed in claim 1 wherein the stationary intermediate containers which are coordinated to that movable intermediate containers which are the first one of their groups in the direction of advance, with the discharge conduit of the medium is connected with its outlet to the last movable intermediate container of the preceding group, in order to allow drainage of the coordinated cell.

3. Apparatus as claimed in claim 1 comprising a movable and a stationary endless circular channel, and partitions in said channels forming said intermediate containers, said movable channel being stepwise rotated around its center axis by said advancing means, and said cells being arranged in a circle corresponding substantially to the circles formed by said channels.

4. Apparatus as claimed in claim 1 comprising connecting lines between the inlet and outlet lines of each cell, and discharge valve means in said connecting lines.

5. Apparatus as claimed in claim 4 wherein said discharge valve means are electromagnetically actuated.

6. An apparatus for the continuous treatment of sugar juice with an adsorbent comprising a plurality of cells containing adsorbent and arranged in at least one circular row at least one first and one second circular channel, partitions in said channels forming a number of compartments substantially corresponding to the number of cells, supply lines connecting the compartments of said first channel with said cells, discharge lines from said cells to the compartments of said second channel, a first feed line feeding sugar juice to a first compartment of said first channel, at least one feed line feeding an adsorbent-reactivating solution to another of said compartments of said first channel, a feed line feeding a wash liquid to still another of said compartments of said first channel, means advancing stepwise at predetermined time intervals said second channel as well as the supply lines for said first channel so as to cyclically change the supply to the compartments of said first channel and to connect the cells sequentially with subsequent compartments of said second channel, thereby providing cell groups, each comprising a number of cells defined by the spacing of said supply lines, whereby the entire cell groups and the individual cells within said groups are subjected sequentially and cyclically to the various treatments, a drainage line, connections from the compartments of said second channel to said drainage line, connections between said supply lines and discharge lines of each cell, and valve means in both said connections, said valve means being normally closed but open in those cells which have been advanced from the end position of one group and have not yet become cells of the next group so as to allow drainage of said cells before they enter the next treatment cycle.

References Cited

UNITED STATES PATENTS

| | | | |
|---|---|---|---|
| 2,377,875 | 6/1945 | Geissler | 127—13 |
| 2,595,627 | 5/1952 | Barnebl et al. | 127—46 |
| 3,214,293 | 10/1965 | Mountfort | 127—9 |

OTHER REFERENCES

"Moving Bed-Chamber Technique in Ion Exchange," Lynam et al., Manufacturing Chemistry 21, 60–64, 77, February 1950.

MORRIS O. WOLK, Primary Examiner

D. G. CONLIN, Assistant Examiner

U.S. Cl. X.R.

127—13, 46, 55; 210—191, 264